(12) United States Patent
Baumgartner et al.

(10) Patent No.: US 8,116,055 B2
(45) Date of Patent: *Feb. 14, 2012

(54) METHODS AND APPARATUSES FOR PERFORMING COMMON MODE PULSE COMPENSATION IN AN OPTO-ISOLATOR

(75) Inventors: Richard A. Baumgartner, Palo Alto, CA (US); Kwee Chong Chang, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,036

(22) Filed: Mar. 8, 2010

(65) Prior Publication Data

US 2010/0155627 A1    Jun. 24, 2010

Related U.S. Application Data

(63) Continuation-in-part of application No. 11/766,333, filed on Jun. 21, 2007, now Pat. No. 7,808,759.

(51) Int. Cl.
*H02H 9/08* (2006.01)
(52) U.S. Cl. ........................ 361/93.9; 361/111
(58) Field of Classification Search ............... 361/93.9, 361/111
See application file for complete search history.

(56) References Cited

U.S. PATENT DOCUMENTS

| | | | |
|---|---|---|---|
| 4,568,838 A | 2/1986 | Honda et al. | |
| 5,043,587 A | 8/1991 | Miki et al. | |
| 5,089,948 A | 2/1992 | Brown et al. | |
| 5,465,298 A | 11/1995 | Wilkison et al. | |
| 6,586,890 B2 | 7/2003 | Min et al. | |
| 7,253,997 B2 | 8/2007 | Balakrishnan et al. | |
| 7,420,335 B2 | 9/2008 | Robinson et al. | |
| 7,482,666 B2 | 1/2009 | Holcombe et al. | |
| 2003/0048008 A1 | 3/2003 | Castagnet et al. | |
| 2005/0225976 A1 | 10/2005 | Zampini et al. | |
| 2007/0115248 A1 | 5/2007 | Roberts et al. | |
| 2008/0062606 A1 | 3/2008 | Brown et al. | |
| 2008/0169834 A1 | 7/2008 | Chen et al. | |
| 2008/0292325 A1 | 11/2008 | Chen et al. | |
| 2008/0308817 A1 | 12/2008 | Wang et al. | |
| 2008/0315925 A1 | 12/2008 | Alfano et al. | |

OTHER PUBLICATIONS

Hewlett-Packard, , "Insulation and Regulation of Optically Coupled Isolation Devices", http://www.secomtel.com/UpFilesPDF/PDF/Agilent/PDF_DOCS/ISONCONT/01_OPTO/optocouplerdg.pdf Nov. 12, 1999.

Hewlett-Packard, "Insulation and Regulation of Optically Coupled Isolation Devices"; http://www.secomtel.com/ UpFilesPDF/PDF/Agilent/PDF_DOCS/ISONCONT/01_OPTO/optocouplerdg.pdf; Nov. 12, 1999; Designer's Guide, 70 pages.

*Primary Examiner* — Rexford Barnie
*Assistant Examiner* — Christopher Clark (57) ABSTRACT

In an opto-isolator, a common mode pulse compensation circuit is provided that senses when a common mode pulse event occurs and that adds current to the LED drive current to compensate for a decrease in the LED drive current caused by the occurrence of the event. The common mode pulse compensation circuit is capable of operating effectively over a very wide range of common mode pulse slopes by automatically adjusting the amount of current that is added to the LED drive current based at least in part on the slope of the sensed common mode pulse. In addition, the common mode pulse compensation circuit is capable of being implemented with LEDs that operate at very low drive currents, which allows the power consumption requirements of the opto-isolator to be reduced.

14 Claims, 4 Drawing Sheets

METHODS AND APPARATUSES FOR PERFORMING COMMON MODE PULSE COMPENSATION IN AN OPTO-ISOLATOR

CROSS-REFERENCE TO RELATED APPLICATIONS

This application is a continuation-in-part of application Ser. No. 11/766,333, filed on Jun. 21, 2007, entitled "METHODS AND APPARATUSES FOR PERFORMING COMMON MODE PULSE COMPENSATION IN AN OPTO-ISOLATOR", which has been allowed, but which has not yet issued as a patent.

TECHNICAL FIELD OF THE INVENTION

The invention relates to opto-isolators, and more particularly, to performing common mode pulse compensation in an opto-isolator.

BACKGROUND OF THE INVENTION

An opto-isolator is a device that transfers a signal optically between two electrical circuits while, at the same time, electromagnetically isolating the circuits from each other. Opto-isolators are used to transfer signals between circuits that are operating at different potentials, isolate one part of a system from another part for electrical noise or safety reasons, and protect circuits against damage from voltage surges. A transmitter circuit on the transmitter side of the opto-isolator comprises an electrical-to-optical converter (EOC), such as a visible or infrared light emitting diode (LED), for example, that converts the electrical signal into an optical signal. A receiver circuit on the receiver side of the opto-isolator comprises an optical-to-electrical converter, such as a photodiode, that converts the optical signal back into an electrical signal.

The transmitter and receiver circuits of an opto-isolator are typically integrated circuits (ICs). It is desirable to integrate these ICs within the same IC package in order to keep the overall size of the opto-isolator small. However, the close proximity of the transmitter and receiver circuits results in capacitive coupling between the ground reference of the receiver IC and the leads that drive the transmitter LED. This capacitive coupling can cause the common mode pulses between the ground reference points of the two circuits to either increase or decrease the drive current on the LED leads. This increased or decreased drive current can affect the On and Off states of the LED, and consequently, the performance of the opto-isolator.

Figure 1:
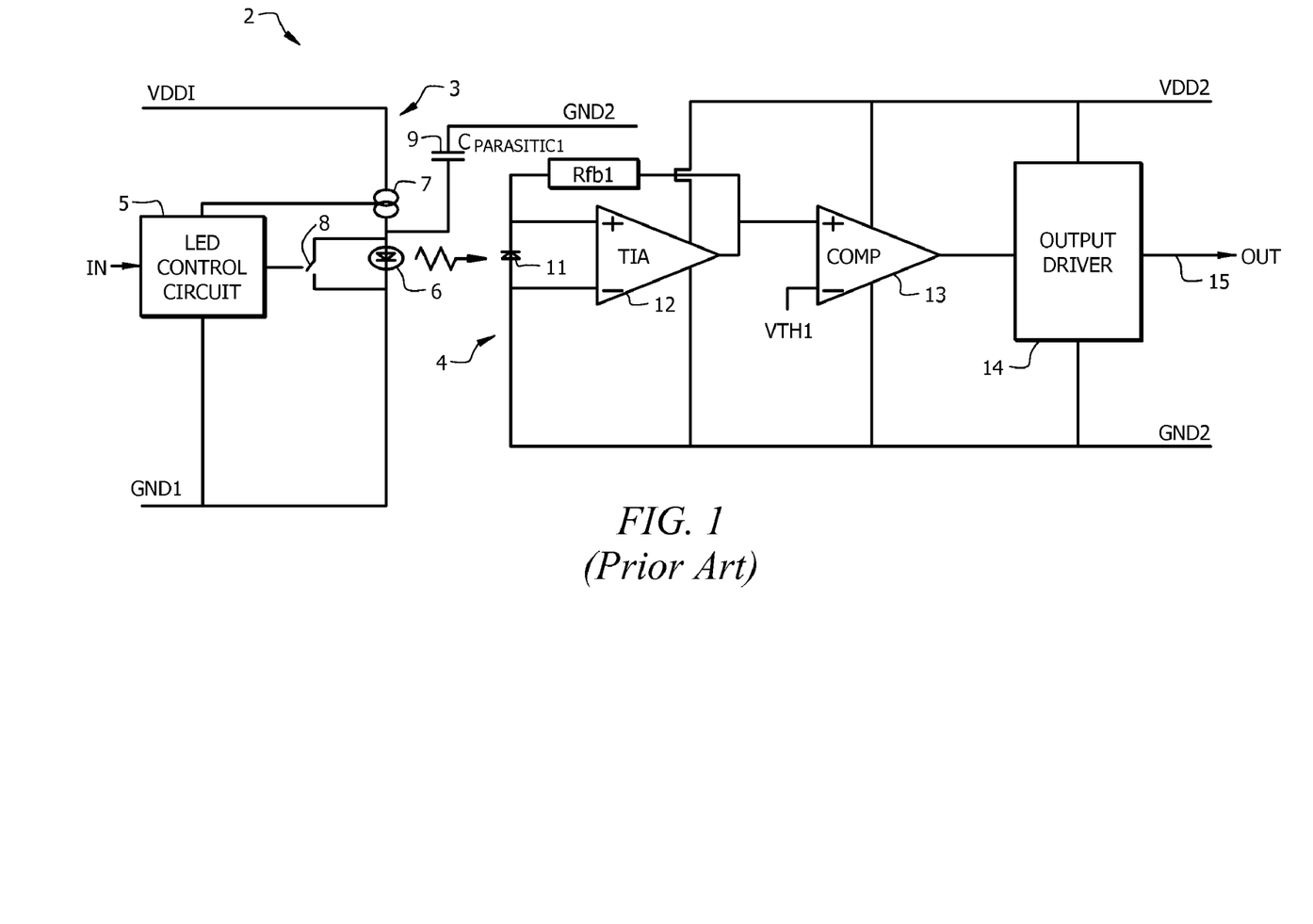
FIG. 1 illustrates a block diagram of a known opto-isolator having a transmitter IC and a receiver IC.

FIG. 1 illustrates a block diagram of a typical opto-isolator 2 having a transmitter IC 3 and a receiver IC 4. The transmitter IC 3 includes an LED control circuit 5 having input interface logic (not shown) for receiving an electrical input signal, and an LED driver circuit (not shown) for generating a drive current that drives an LED 6. The LED 6 is typically separate from the transmitter IC 3 and is usually made using a III-V process technology. The LED 6 is connected by wire bonds (not shown) to the transmitter IC 3. A supply voltage VDD1 and a ground reference GND1 are provided to the transmitter IC 3. The transmitter IC 3 includes a current source 7 for turning the LED 6 on and a shorting switch 8 for ensuring that the LED 6 is turned off when it is supposed to be in the Off state. The transmitter IC 3 also includes an input logic interface (not shown). There is a small, but significant, stray parasitic capacitance between the bond wires going to the LED 6 and the ground reference, GND2, node of the receiver IC 4. This parasitic capacitance is represented by capacitor 9.

The receiver IC 4 includes a silicon photodiode 11, a trans-impedance amplifier (TIA) 12 with a feedback resistor rfb1, a comparator 13 and an output driver 14. The optical output of the LED 6 is coupled to the photodiode 11 on the receiver IC 4. The photon input to the photodiode 11 produces a corresponding photo current in the diode 11. This current is amplified in the TIA 12 and then the output is sent to the comparator 13. The comparator 13 compares the output from the TIA 12 to a reference voltage, VTH1, to determine whether the output corresponds to a logic 0 or logic 1 state and provides an output signal to the output driver 14, which produces the output drive signal for the opto-isolator 2 at node 15.

Typically, the operations of the TIA 12, the comparator 13, and the output driver 14 result in a logic 0 being output from the opto-isolator 2 at node 15 if the LED 6 is turned on and the receiver photo current is above the threshold level VTH1. A logic 1 will occur if the LED 6 is turned off. This works well if there is not a significant interfering signal between the transmitter IC 3 and the receiver IC 4. A common mode interference is defined as a signal between the GND1 and GND2 reference points. A key function of the opto-isolator 2 is to permit the transfer of logic signals between two different electrical systems that may be operating at substantially different voltage potentials. This key function is performed well as long as there is not an excessive transient component between the two ground reference points. An excessive transient component is a signal that will disrupt the operation of the isolator.

If the slope of the waveform representing the common mode pulse between the GND1 and GND2 references has a slope greater than about $-10$ KV/$\mu$sec, there will be significant current pulled from the bond wires going to the LED 6 through the parasitic capacitor 9. The relationship between this slope, the parasitic capacitance and the current pulled away from the LED 6 is expressed as:

$$I\_error = Cparasitic * -dV/dT,$$

where I_error represents the portion of the drive current pulled away from the LED 6 by the parasitic capacitor 9, Cparasitic represents the parasitic capacitance, and dV/dT represents the slope of the common mode pulse. The negative sign means the GND2 potential decreases with respect to GND1. Using this equation, it can be determined that for a common mode pulse having a slope of $-10$ KV/$\mu$sec, the current I_error through a typical Cparasitic value of 50 femtofarads (fF) is 0.5 milliamperes (mA). This current level is relatively high, which means that a significant portion of the drive current for the LED 6 has been pulled through the parasitic capacitance and thereby diverted from the LED 6. This reduces the optical output of the LED 6 and may cause the corresponding signal output from the TIA 12 to drop below the threshold level of the comparator 13, resulting in errors occurring during the operation of the opto-isolator 2.

During an experiment, it was observed that for a common mode signal between GND1 and GND 2 having a slope of $-30$ KV/usec and Cparasitic=100 fF, the reduction of the LED drive current due to losses through Cparasitic causes the optical output of the LED 6 to be reduced to the point that errors occurred. The reduction in the drive current caused the electrical output from the photodetector 11 to be reduced, which, in turn, caused the voltage signal output from the TIA 12 to drop below the threshold voltage VTH1 of the comparator 13. When this happened, a single LED On pulse received by the receiver 4 resulted in two output pulses at the output node 15 of the opto-isolator 2, which is an improper result.

The traditional approach used to correct this problem is to decrease the size of the parasitic capacitance between the bond wires to the LED 6 and GND2. This can help, but as the IC package geometries become smaller, the dimensions between elements with potential for parasitic capacitances make this adjustment more difficult to achieve. Another approach used to correct this problem is to increase the LED drive current to the point that the perturbations in the drive current caused by the occurrence of common mode pulses between GND1 and GND2 no longer affect the On state of the LED. The use of increased LED drive current, however, also increases the power consumption of the opto-isolator, which is in direct conflict with the dual goals of providing low-power operation in opto-isolators and adequate isolation in various technological applications.

Accordingly, a need exists for a way to correct problems in opto-isolators that are caused by the effects of common mode pulses between the ground references GND1 and GND2 of the transmitter and receiver ICs 3 and 4 and the parasitic capacitance between the wire bonds to the LED 6 and GND2.

SUMMARY OF THE INVENTION

The invention provides methods and apparatuses for compensating for the effects of common mode pulses that occur in an opto-isolator. The opto-isolator has a transmitter circuit, an electrical-to-optical converter (EOC), and a receiver circuit. The transmitter circuit has an EOC control circuit for controlling the EOC, a primary current source for generating a drive current for driving the EOC, and a common mode pulse compensation (CMPC) circuit that senses if a common mode pulse event is occurring, and if so, generates a compensation current that is output from a first output terminal of the CMPC circuit to the current source. At the current source, the compensation current and the drive current are added together to produce a new drive current that is used to drive the EOC. A common mode pulse event corresponds to a common mode pulse waveform occurring between a reference ground, GND1, of the transmitter circuit and a reference ground, GND2, of the receiver circuit. The EOC is operatively connected to the transmitter circuit and receives the new drive current from the CMPC circuit and produces an optical signal that is based on the new drive current received by the EOC.

The receiver circuit has an optical-to-electrical converter (OEC), an amplifier, a comparator and an output driver. The OEC receives the optical signal produced by the EOC, converts the optical signal into an electrical signal, and outputs the electrical signal. The amplifier amplifies the electrical signal output from the OEC. The comparator compares the amplified electrical signal to a reference signal and produces an electrical output signal based on the comparison. The output driver receives the electrical output signal and produces an electrical output drive signal for the opto-isolator.

The method comprises the following: in a CMPC circuit of an opto-isolator, if the CMPC circuit senses that a common mode pulse event is occurring, it responds by generating a compensation current in the CMPC circuit to be added to an EOC drive current used for driving an EOC of the opto-isolator, outputting the compensation current from an output terminal of the CMPC circuit to a current source of the transmitter circuit of the opto-isolator, adding the compensation current to a drive current produced by the current source to produce a new drive current, and using the new drive current to drive the EOC of the opto-isolator. Using the new drive current to drive the EOC of the opto-isolator compensates for perturbations in the drive current produced by the current source that are caused by the occurrence of common mode pulse event.

These and other features and advantages of the invention will become apparent from the following description, drawings and claims.

DETAILED DESCRIPTION OF AN ILLUSTRATIVE EMBODIMENT

In accordance with the invention, a common mode pulse compensation circuit is provided that senses when a common mode pulse event occurs in an opto-isolator and adds current to the LED drive current to compensate for a decrease in the LED drive current caused by the occurrence of the event. The common mode pulse compensation circuit is capable of operating effectively over a very wide range of common mode pulse slopes by automatically adjusting the amount of current that is added to the LED drive current based at least in part on the slope of the sensed common mode pulse. In addition, the common mode pulse compensation circuit is capable of being implemented with LEDs that operate at very low drive currents, which allows the power consumption requirements of the opto-isolator to be reduced. These and other features will now be described with reference to FIGS. 2-4. The following describes illustrative embodiments of the common mode pulse compensation circuit and method.

Figure 2:
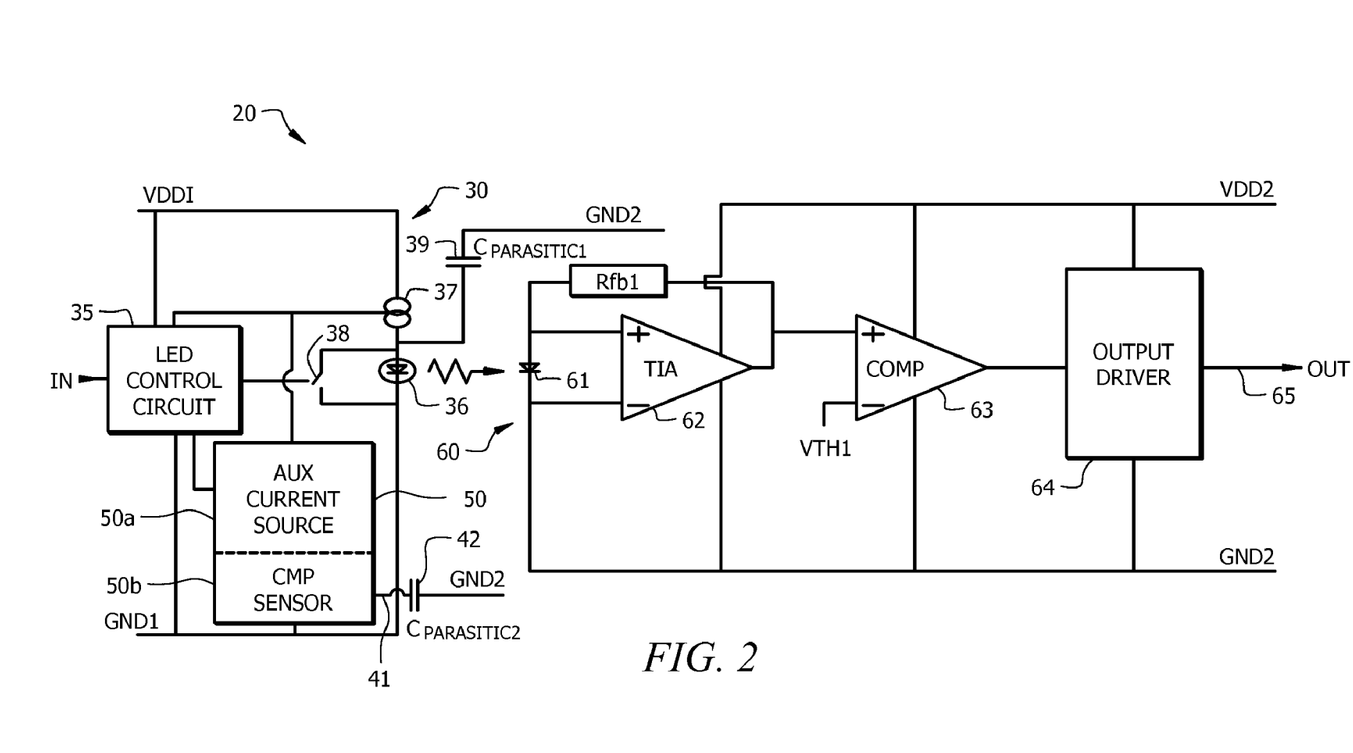
FIG. 2 illustrates a block diagram of an opto-isolator in accordance with an illustrative embodiment.

FIG. 2 illustrates a block diagram of the opto-isolator 20 in accordance with an illustrative embodiment. Like the opto-isolator 2 shown in FIG. 1, the opto-isolator 20 has a transmitter IC 30 and a receiver IC 60, which are typically implemented in a single IC package. The transmitter IC 30 includes an electrical-to-optical converter (EOC) control circuit 35 having input interface logic (not shown) for receiving an electrical input signal to the opto-isolator 20 that is used to control the operations of an EOC 36. The EOC 36 is typically separate from the transmitter IC 30 and is usually made using a III-V process technology. Because the EOC 36 is typically an LED, the EOC 36 will be referred to hereinafter as the "LED 36" and the EOC control circuit 35 will be referred to hereinafter as the "LED control circuit 35". The LED 36 is connected by wire bonds (not shown) to the transmitter IC 30. A supply voltage VDD1 and a ground reference GND1 are provided to the transmitter IC 30. The transmitter IC 30 includes a current source 37 for turning the LED 36 on and a shorting switch 38 that is controlled by the LED control circuit 35 to ensure that the LED 36 is turned off when it is supposed to be in the Off state.

The capacitor 39 represents the parasitic capacitance, Cparasitic1, between the bond wires going to the LED 36 and the ground reference node, GND2, of the receiver IC 60. The transmitter IC 30 includes a common mode pulse compensation (CMPC) circuit 50 that senses the current on a section of wire 41 and causes current to be added to the drive current of the LED 36 if the CMPC circuit 50 senses that a common mode pulse event is occurring. The wire 41 has a parasitic capacitance, Cparasitic2, which is represented by capacitor 42. The wire 41 is connected to an input pad (not shown) of the CMPC circuit 50 and has an inherent parasitic capacitance to the nearby GND2 of the receiver IC 60. This sensed current corresponds to a common mode pulse. The CMPC circuit 50 has a sensor 50a and an auxiliary current source 50b, which, as will be described below with reference to FIG. 3, are combined into a single circuit.

When the sensor 50a senses a common mode pulse that has a negative slope and that is sufficiently great in magnitude to cause the opto-isolator 20 to operate improperly, the auxiliary current source 50b outputs a positive pulse to the current source 37. A common mode pulse that has a negative slope and that is sufficiently great in magnitude to cause the opto-isolator 20 to operate improperly will be referred to herein as a "common mode pulse event". The positive pulse that is output from the auxiliary current source 50b compensates for perturbations in the drive current caused by the sensed common mode pulse, thereby ensuring that the current source 37 will output a current that is appropriate for driving the LED 36.

Like the receiver IC 4 shown in FIG. 1, the receiver IC 60 of the opto-isolator 20 shown in FIG. 2 includes an optical-to-electrical converter (OEC) 61, a TIA 62, a comparator 63 and an output driver 64. Because the OEC 61 is typically a photodiode, the OEC 61 will be referred to hereinafter as the "photodiode 61". The optical output of the LED 36 is coupled to the photodiode 61 on the receiver IC 60. The photon input to the photodiode 61 produces a corresponding photo current in the diode 61. This current is amplified in the TIA 62 and then the output is sent to the comparator 63. The comparator 63 compares the output from the TIA 62 to a reference voltage, VTH1, to determine whether the output corresponds to a logic 0 or logic 1 state and provides an output signal to the output driver 64, which produces the output drive signal for the opto-isolator 20 at node 65. The value of Cparasitic2 is typically in the range of 10 fF. The sensor 50a is typically configured to detect a common mode pulse with a negative slope that is greater than or equal to about −10 KV/µsec. As indicated above, if such a common mode pulse event is sensed by the sensor 50a, the auxiliary power source 50b outputs a positive logic pulse to the current source 37 to increase the magnitude of the drive current that is being provided to the LED 36. The CMPC circuit 50 will now be described with reference to FIG. 3.

Figure 3:
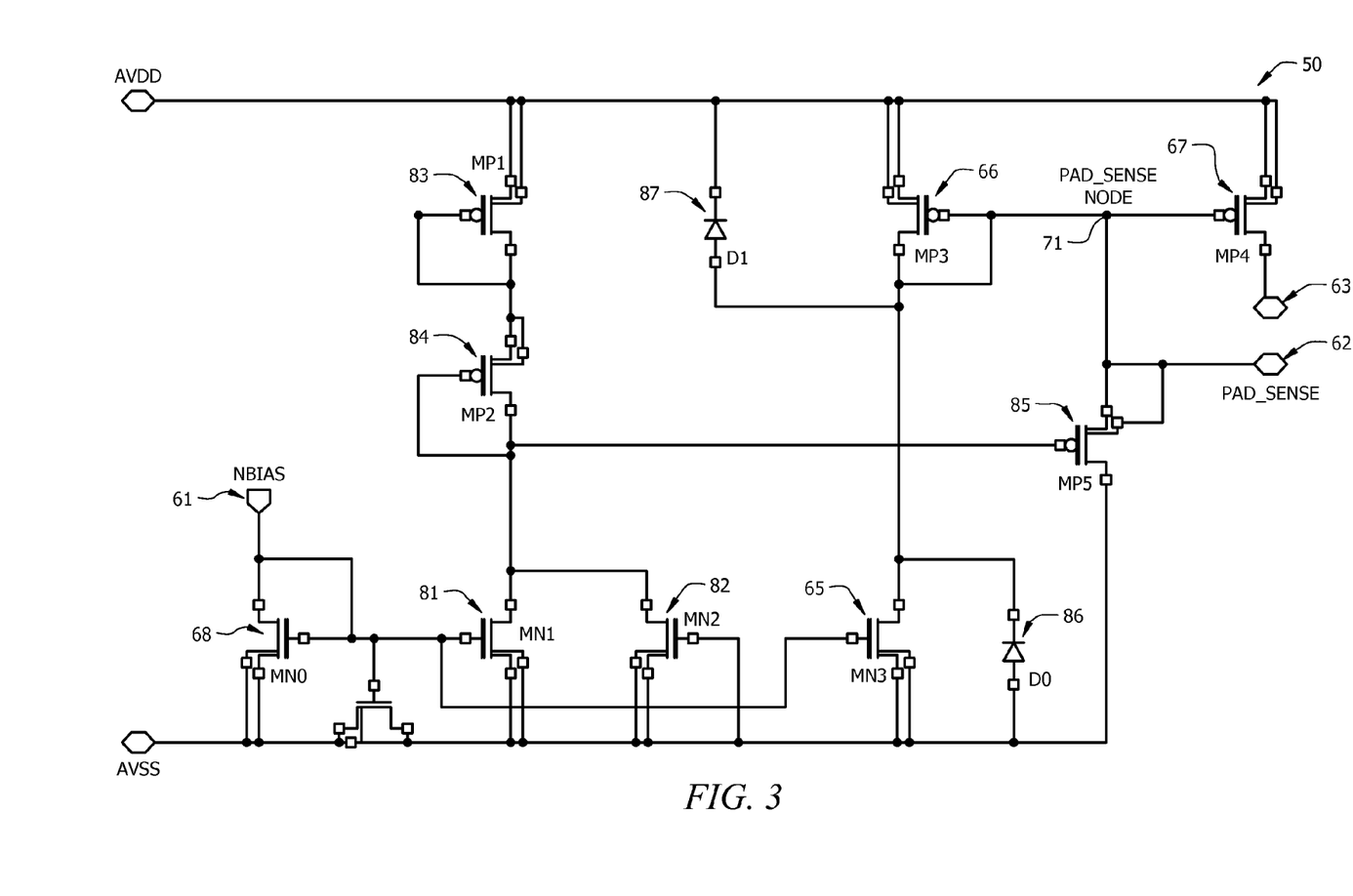
FIG. 3 illustrates a schematic diagram of the CMPC circuit shown in FIG. 2 in accordance with an embodiment.

FIG. 3 illustrates a schematic diagram of the CMPC circuit 50 in accordance with an embodiment. Because the sensor 50a and the auxiliary current source 50b are implemented in a single CMPC circuit 50, and because of the relatively low complexity of the CMPC circuit 50, common mode pulse events are able to be sensed and compensated at a very high speed as they are occurring, e.g., on the order of nanoseconds. The CMPC circuit 50 is made up of a plurality of n-type and p-type metal oxide semiconductor field effect transistors (MOSFETs) and a few diodes. A first input terminal 61 of the CMPC circuit 50 receives a bias current, NBIAS. The bias current NBIAS has a positive polarity and is sufficiently large in amplitude to turn on an n-type MOSFET. The bias current NBIAS is typically maintained in this state at all times during operation of the opto-isolator 20. The bias current NBIAS may be provided to the CMPC circuit 50 by the LED control circuit 35 or by some other source external to the CMPC circuit 50.

A second input terminal 62 of the CMPC circuit 50 is connected to an end of the section of wire 41. The second input terminal 62 will be referred to herein as the PAD_SENSE. Thus, the PAD_SENSE terminal is coupled by the parasitic capacitance Cparasitic2 to the GND2 of the receiver IC 60. An output terminal 63 of the CMPC circuit 50 is connected to the current source 37. The sensing and auxiliary current source functions performed by the sensor 50a and by the auxiliary current source 50b, respectively, both use the MOSFETs 65, 66 and 67, which are also labeled MN3, MP3 and MP4, respectively. The combination of the n-type MOSFET 68, also labeled MN0, and the n-type MOSFET MN3 65 form a 1-to-1 current minor that causes the bias current NBIAS being applied to the gate of MOSFET MN0 68 to be replicated at the gate of MOSFET MN3 65. This bias current NBIAS is typically a small current, e.g., 2.5 microamperes (uA), for the arrangement shown in FIG. 3. The bias current NBIAS also turns on p-type MOSFETs MP3 66 and MP4 67 so that they are above threshold, but at a low current level. The combination of p-type MOSFETs MP3 66 and MP4 67 forms a second current minor that causes the sensed current at the PAD_SENSE input terminal 62 to be applied to the gates p-type MOSFETs 66 and 67. The slight bias current through p-type MOSFETs MP3 66 and MP4 67 ensures that the PAD_SENSE node 71 will be sensitive to negatively-sloped common mode pulses that are coupled into parasitic capacitance Cparasitic2.

The drain terminal of the p-type MOSFET MP4 67 is connected to the output terminal 63. The p-type MOSFET MP4 67 has a width that is selected during the design phase so that the current passing through it and into the anode of the LED 36 via the current source 37 will have the value needed to compensate for the current being lost through Cparasitic1 from the LED bond wire on the anode of the LED 36. The correction current, I_correction, that is needed to keep the LED 36 operating at a constant current or nearly constant when the LED 36 is in the ON state is given by the following equation:

$$I\_correction = Cparasitic1 * -dV/dt.$$

The current flowing into the PAD_SENSING node 71 and being applied to the gate of p-type MOSFET MP3 66 is given by the following equation:
$I\_sense = Cparasitic2 * -dV/dt$. The ratio of the I_correction to I_sense is dependent on the ratio of the two parasitic capacitances, but not on the value of dV/dt, which is the slope of the sensed common mode pulse. This relationship provides the needed information from which the appropriate current gain ratio for the current minor made up of the p-type MOSFETs MP3 66 and MP4 67 current mirror. The result of the ratio situation is used to determine the width of MP4 relative to MP3.

The following equation relates the widths of the p-type MOSFETs MP3 66 and MP4 67 to the parasitic capacitances Cparasitic1 and Cparasitic2.

$$W\_MP4/W\_MP3 = Cparasitic1/Cparasitic2.$$

There is significant advantage to this relationship. Specifically, the negative slope of the common mode pulse that is sensed through Cparasitic2 will result in CMPC circuit 50 providing, via output terminal 63, a correction current of the correct amplitude over a wide range of slope values, e.g., from about −10 KV/µsec up to about −50 KV/µsec. For example, assuming that Cparasitic1 is 100 fF and Cparasitic2 is estimated to be 10 fF, then the ratio of W_MP4 to W_MP3 is 10 to 1. Hence, the width of p-type MOSFET MP4 67 is selected to be 10 times the width of p-type MOSFET MP3 66. Because the value of Cparasitic2 is known and the value of Cparasitic1 can be measured, the ratio of W_MP4 to W_MP3 can be calculated using the above equation. By selecting the widths W_MP3 and W_MP4 such that the proper width ratio is obtained, the CMPC circuit 50 becomes automatically adjustable to changes in the magnitude of the slope of a common mode pulse event. This feature extends the range of slopes for which the CMPC circuit 50 can react and provide compensation.

In accordance with an embodiment, the CMPC circuit 50 is intentionally designed to compensate for negatively-sloped common mode pulse events, but not for positively-sloped common mode pulse events. A positively-sloped common mode pulse event will indeed result in an increase in the drive current of the LED 36. However, even with common mode pulse events that have slopes as great is 50 KV/μsec, the extra current added to the LED drive current only operates to turn the LED 36 on to an even greater extent, which will not cause errors out the output terminal 65 of the receiver IC 60. LEDs are typically designed to handle short bursts of high drive current as well as lower current levels of relatively long duration. Therefore, compensation is not necessary for positively-sloped common mode pulse events in the CMPC circuit 50. However, the CMPC circuit 50 does provide protection for its components against positively-sloped common mode pulse events that are excessively large in magnitude, as will be described below in more detail. If the LED 36 is turned off during a positively-sloped common mode pulse event, the LED shorting switch 38 must handle the extra current to ensure that the LED 36 remains turned off. Prior to describing the manner in which the CMPC circuit 50 handles positively-sloped common mode pulse events, the manner in which the CMPC circuit 50 handles negatively-sloped common mode pulse events will be described.

If a negatively-sloped common mode pulse event occurs, the negative excursion of the voltage present at the PAD_SENSE input terminal 62 turns on the p-type MOSFETs MP3 66 and MP4 67, causing the output terminal 63 to be pulled toward the supply voltage level, AVDD. In this state, the CMPC circuit 50 causes an additional amount of current to be added to the current source 37 via the connection between the output terminal 63 and the current source 37, which is connected to the anode of the LED 36. The additional current will be referred to hereinafter as the compensation current. The compensation current to be added to the current source 37 is equal to AVDD divided by the resistance of the p-type MOSFET MP4 67. The compensation current is generally equal to the current that is pulled away from the current source 37 as a result of the negatively-sloped common mode pulse event.

The CMPC circuit 50 includes additional MOSFETs MN1 81, MN2 82, MP1 83, MP2 84, and MP5 85, and two diodes D0 86 and D1 87 that are used to provide protection against excessively large positively-sloped common mode pulse events. The combination of the MOSFETs MN1 81, MN2 82, MP1 83, and MP2 84 generates a bias voltage for the gate of MOSFET 85 that is compensated for both temperature and process. If the voltage excursion on the PAD_SENSE terminal 62 has a positive slope and increases above the level needed to turn off p-type MOSFETs MP3 66 and MP4 67, the MOSFET MP5 85 will turn on, thereby causing the PAD_SENSE node 71 to be limited to slightly below the AVDD supply level, but high enough so that MP3 66 and MP4 67 are off. This causes the voltage at the PAD_SENSE node 71 to be clamped at a level that does not exceed the AVDD supply voltage level. The two diodes D0 86 and D1 87 are additional elements for providing protection of circuit elements from excessive common mode transients.

It should be noted that the CMPC circuit 50 is not limited to the configuration shown in FIG. 3. A number of different circuit configurations may be used to perform the compensation functions described above with reference to FIG. 3. In addition, while only the negatively-sloped common pulse events are compensated for by the CMPC circuit 50, the CMPC circuit 50 could be designed to compensate for both negatively-sloped and positively-sloped events, or to compensate for positively-sloped events rather than negatively-sloped events. In general, this could be accomplished by substituting the p-type MOSFETs with n-type MOSFETs or by adding additional n-type MOSFETs that duplicate the functions described above that are performed by the p-type MOSFETs.

Figure 4:
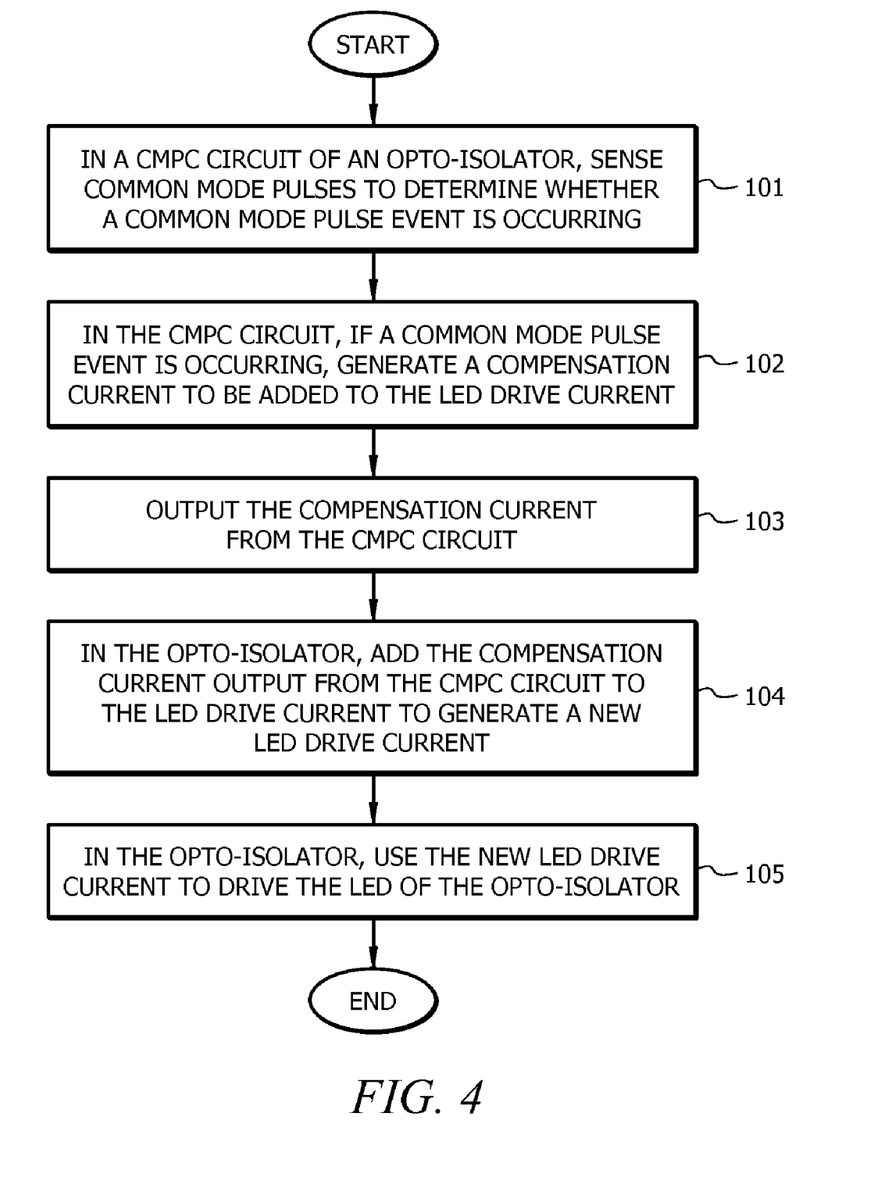
FIG. 4 illustrates a flowchart that represents the method for compensating for the effects of common mode pulse events in an opto-isolator accordance with an embodiment.

FIG. 4 illustrates a flowchart that represents the method for performing common mode pulse compensation in an opto-isolator. In a CMPC circuit of an opto-isolator, common mode pulses are sensed to determine whether a common mode pulse event is occurring, as indicated by block 101. As indicated above, the CMPC circuit is capable of reacting extremely quickly so that common mode pulse events are compensated for as the events are occurring. If a common mode pulse event is occurring, then the CMPC circuit generates a compensation current to be added to the LED drive current, as indicated by block 102. The compensation current is output from the CMPC circuit, as indicated by block 103, and added to the LED drive current to obtain a new LED drive current, as indicated by block 104. The new LED drive current is used in the opto-isolator to drive the LED, as indicated by block 105.

It should be noted that the invention has been described with reference to illustrative embodiments for the purpose of demonstrating the principles and concepts of the invention. The invention is not limited to these embodiments, as will be understood by those skilled in the art in view of the description provided herein. For example, the circuits shown in FIGS. 3 and 4 are merely examples of embodiments that are suitable for performing the functions needed to compensate the LED drive current. A variety of circuits can be designed to perform these tasks, and all such variations or modifications to the embodiments described herein are within the scope of the invention. Also, while the opto-isolator has been described as having a transmitter and a receiver IC that are contained in the same IC package, these may be implemented in two or more ICs, and may even be implemented using discrete components. It should be noted that although the EOC of the transmitter IC is described herein as being an LED, the EOC may be any type of light source, including laser diodes and other devices. Similarly, it should be noted that although the OEC of the receiver circuit is described herein as being a photodiode, the OEC may be any type of device that converts optical energy into electrical energy. Other variations and modifications may be made to the embodiments described herein, as will be understood by those skilled in the art, and such modifications and variations are within the scope of the invention.

What is claimed is:

1. An opto-isolator comprising:
a transmitter circuit having an electrical-to-optical converter (EOC) control circuit for controlling an EOC, a primary current source for generating a drive current for driving an EOC, and a common mode pulse compensation (CMPC) circuit that senses if a common mode pulse event is occurring, and if so, generates a compensation current that is output from a first output terminal of the CMPC circuit to the current source such that the compensation current and the drive current add together to produce a new drive current that is used to drive the EOC, and wherein a common mode pulse event corresponds to a common mode pulse waveform occurring between a reference ground, GND1, of the transmitter circuit and a reference ground, GND2, of a receiver circuit;

the electrical-to-optical converter (EOC) operatively connected to the transmitter circuit, wherein the EOC receives the new drive current from the CMPC circuit and produces an optical signal that is based on the new drive current received by the EOC; and the receiver circuit having an optical-to-electrical converter (OEC), an amplifier, a comparator and an output driver, wherein the OEC receives the optical signal produced by the EOC, converts the optical signal into an electrical signal, and outputs the electrical signal, the amplifier amplifying the electrical signal output from the OEC, the comparator comparing the amplified electrical signal to a reference signal and producing an electrical output signal based on the comparison, the output driver receiving the electrical output signal and producing an electrical output drive signal for the opto-isolator.

2. The opto-isolator of claim 1, wherein the CMPC circuit only generates the compensation current if the CMPC circuit senses a common mode pulse event corresponding to a common mode pulse waveform having a negative slope.

3. The opto-isolator of claim 2, wherein the CMPC circuit includes protection circuitry that clamps the compensation current to a predetermined maximum level if the CMPC circuit senses a common mode pulse event corresponding to a common mode pulse having a positive slope.

4. The opto-isolator of claim 2, wherein the CMPC circuit generates the compensation current for sensed common mode pulse events having negative slopes that range from about −10 kilovolts per microsecond (KV/μsec) to about −50 KV/μsec.

5. The opto-isolator of claim 2, further comprising:

an electrically conductive section of wire having first and second ends, the first end of the wire being connected to a first input terminal of the CMPC circuit, the wire having an inherent parasitic capacitance, Cparasitic2, and wherein the CMPC circuit senses whether a common mode pulse event has occurred based on an electrical current, I_sense, present at the first input terminal, the electrical current I_sense being equal to Cparasitic2×−dV/dt, where dV/dt corresponds to a slope of the sensed common mode pulse event waveform and is defined as a change in the common mode pulse event waveform over time.

6. The opto-isolator of claim 5, wherein the EOC is electrically connected to the transmitter circuit by a bond wire, the bond wire having an inherent parasitic capacitance, Cparasitic1, and wherein the bond wire has an electrical current, I_correction, thereon, the electrical current I_correction being equal to Cparasitic1×−dV/dt, and wherein the CMPC circuit comprises a current mirror that is connected to the first output terminal of the CMPC circuit, the current mirror comprising at least first and second metal oxide semiconductor field effect transistors (MOSFETs), the first and second MOSFETs each having a gate that is connected to a PAD_SENSE node of the CMPC circuit, and wherein the PAD_SENSE node is connected to the first input terminal of the CMPC circuit, and wherein the first and second MOSFETs have widths W1 and W2, respectively, and wherein values for W1 and W2 are selected at a time that the CMPC circuit is designed such that a ratio W2/W1 equals or approximately equals a ratio Cparasitic1/Cparasitic2.

7. The opto-isolator of claim 6, wherein the first and second MOSFETs are p-type MOSFETs.

8. A method for performing common mode pulse compensation in an opto-isolator comprising:

in a common mode pulse compensation (CMPC) circuit of an opto-isolator, if the CMPC circuit senses that a common mode pulse event is occurring, generating a compensation current in the CMPC circuit to be added to an electrical-to-optical converter (EOC) drive current used for driving an EOC of the opto-isolator, and wherein a common mode pulse event corresponds to a common mode pulse waveform occurring between a reference ground, GND1, of a transmitter circuit of the opto-isolator and a reference ground, GND2, of a receiver circuit of the opto-isolator;

outputting the compensation current from an output terminal of the CMPC circuit to a current source of the transmitter circuit of the opto-isolator;

adding the compensation current to a drive current produced by the current source to produce a new drive current; and using the new drive current to drive the EOC of the opto-isolator, wherein using the new drive current to drive the EOC of the opto-isolator compensates for perturbations in the drive current produced by the current source that are caused by the occurrence of the sensed common mode pulse event.

9. The method of claim 8, wherein the CMPC circuit only performs the step of generating the compensation current if the CMPC circuit senses the occurrence of a common mode pulse event corresponding to a common mode pulse waveform that has a negative slope.

10. The method of claim 9, the method further comprising:

if the CMPC circuit senses the occurrence of a common mode pulse event corresponding to a common mode pulse having a positive slope, in protection circuitry of the CMPC circuit, clamping the compensation current to a predetermined maximum level.

11. The method of claim 9, wherein during the generating step, the CMPC circuit generates the compensation current for sensed common mode pulse events corresponding to common mode pulse event waveforms that have negative slopes that range from about −10 kilovolts per microsecond (KV/μsec) to about −50 KV/μsec.

12. The method of claim 9, further comprising:

with an electrically conductive wire having a end connected to the first input terminal of the CMPC circuit, sensing an electrical current, I_sense, in the wire, wherein the wire has an inherent parasitic capacitance, Cparasitic2, and wherein the CMPC circuit senses whether a common mode pulse event Is occurring based on the electrical current I_sense present at the first input terminal, the electrical current I_sense being equal to Cparasitic2×−dV/dt, where dV/dt corresponds to a slope of the sensed common mode pulse event waveform and is defined as a change in the common mode pulse event waveform over time.

13. The method of claim 12, wherein the EOC is electrically connected to the transmitter circuit by a bond wire, the bond wire having an inherent parasitic capacitance, Cparasitic1, and wherein the bond wire has an electrical current, I_correction, thereon, the electrical current I_correction being equal to Cparasitic1×−dV/dt, and wherein CMPC circuit comprises a current mirror that is connected to the first output terminal of the CMPC circuit, the current mirror comprising at least first and second metal oxide semiconductor field effect transistors (MOSFETs), the first and second MOSFETs each having a gate that is connected to a PAD_SENSE node of the CMPC circuit, and wherein the PAD_SENSE node is connected to the first input terminal of the CMPC circuit, and wherein the first and second MOSFETs have widths W1 and W2, respectively, and wherein W1 and W2 are selected at a time that the CMPC circuit is designed such that a ratio W2/W1 equals or approximately equals a ratio $C_{parasitic1}/C_{parasitic2}$.

14. The method of claim 13, wherein the first and second MOSFETs are p-type MOSFETs.

* * * * *